United States Patent Office.

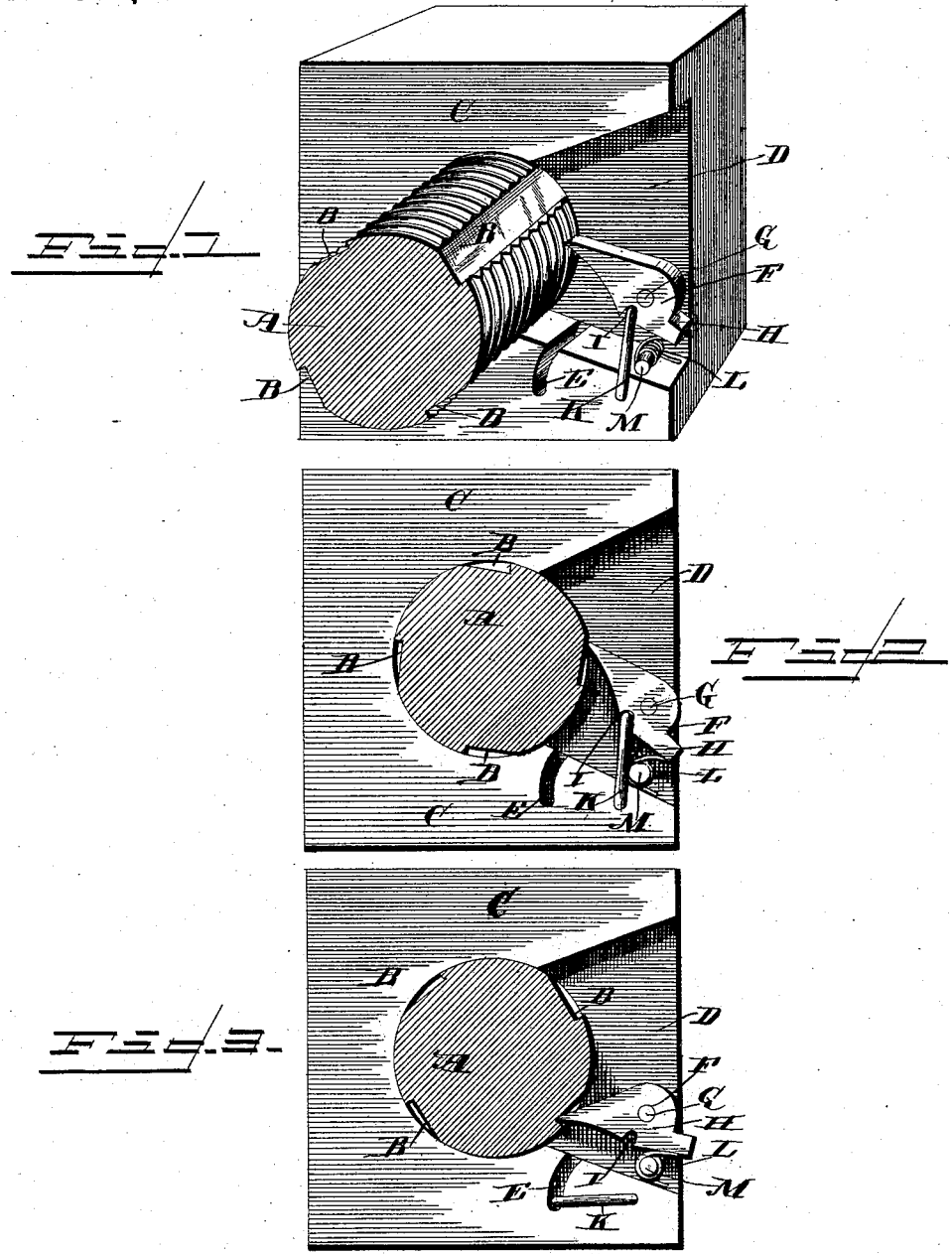

HENRY CLINTON BOWEN, OF LAMAR, MISSOURI.

NUT-LOCK.

SPECIFICATION forming part of Letters Patent No. 376,179, dated January 10, 1888.

Application filed September 15, 1887. Serial No. 249,802. (No model.)

*To all whom it may concern:*

Be it known that I, HENRY CLINTON BOWEN, a citizen of the United States, residing at Lamar, in the county of Barton and State of Missouri, have invented a new and useful Improvement in Nut-Locks, of which the following is a specification.

My invention relates to an improvement in nut-locks; and it consists in the peculiar construction and combination of devices, that will be more fully set forth hereinafter, and particularly pointed out in the claim.

In the drawings, Figure 1 is a perspective view of a nut-locking device embodying my improvements. Fig. 2 is a front elevation of the same. Fig. 3 is a similar view showing the detent in another position.

A represents a bolt of the usual construction, the threaded shank of which is provided with a series of longitudinal ratchet-grooves, B.

C represents the nut, having the threaded openings adapted to engage the threaded shank of the bolt. In the outer side of the nut is a recess, D, which extends from the center thereof to one edge, the sides of the said recess diverging outwardly, as shown.

E represents a curved groove or recess made in the face of the nut, near the center thereof, the inner end of the said curved recess E communicating with the inner portion of the recess D.

F represents a pawl or detent, which is arranged in the recess D, and is pivoted on a pin or bolt, G, which extends through the nut. The inner end of this pawl or detent is adapted to engage the ratchet-grooves in the bolt, and the outer end thereof is provided at one corner with a projecting trip-arm, H. On the inner edge of the pawl or detent, at a suitable distance from the engaging-points thereof, is a notch, I.

K represents a yoke, which has one end pivoted in an opening in the face of the nut. The outer end of the said yoke is bent inward at right angles and caused to move in the groove E. The length of this yoke is such that when it is moved outward from the groove E into the recess D it is adapted to engage the notch I on the inner side of the pawl or detent, and thereby retain the latter in such a position that its engaging end is out of contact with the bolt, thereby enabling the nut to be readily unscrewed and withdrawn from the bolt.

L represents a spring having a central coil, which is pivoted on a pin, M, that projects from the face of the recess D near one side thereof. The two arms of the spring project from its coiled central portions and diverge therefrom, one of the said arms bearing against one side of the recess D and the other arm bearing against the opposing side of the pawl or detent near the outer end thereof.

The operation of my invention is as follows: The yoke is normally disengaged from the detent, as illustrated in Fig. 3. When the nut is applied to the bolt, when screwed thereon, the pawl slips idly over the threaded stem of the bolt. When the nut is screwed home, it is so turned with relation to the bolt that the end of the pawl or detent is caused by the spring L to engage one of the ratchet-grooves, and thereby prevent the nut from being rotated on the bolt in a reverse direction, consequently securely locking the nut to the bolt.

When it is desired to unscrew the nut from the bolt, the operator presses against the triparm H, and thereby turns the pawl or detent on its pivot a sufficient distance to cause it to disengage the notch in the bolt. He then turns the yoke K to the position indicated in Figs. 1 and 2, and causes it to engage the notch I, and thereby hold the pawl or detent out of engagement with the bolt, after which the nut may be readily unscrewed from the bolt.

The spring L forces the pawl into such position that the bearing of the bolt, when the nut starts to unscrew, is in a line inclining upward slightly from the engaging-point of the pawl to the pivot of the same, and nearly coinciding with the line between pivot and point. Consequently, even were the spring L removed, the nut could not unscrew without breaking the pawl.

The function of the spring L is not to hold the pawl engaged, but to force it into position to engage in the manner described.

It is almost unnecessary to say that the manner of engagement is much more secure than that caused by a spring, which could be put under tension without breaking the pawl.

Having thus described my invention, I claim—

The combination, with the bolt having the longitudinal ratchet-grooves B and the nut having the recesses D and E, of the pawl F, having the trip-arm H on its outer end and the notch I on its lower edge, and pivoted at G in the recess D, the coiled spring L on the pin M, arranged to put the point of the pawl into position to engage in one of the grooves of the bolt at a point a very little lower than the pivot thereof, and the pivoted yoke K, moving in the recess E and arranged to turn up into the notch I and hold the pawl out of engagement, substantially as specified.

In testimony that I claim the foregoing as my own I have hereto affixed my signature in presence of two witnesses.

HENRY CLINTON BOWEN.

Witnesses:
I. A. BOWEN,
L. G. MALLONEE.